US010823977B2

(12) United States Patent
Wang et al.

(10) Patent No.: US 10,823,977 B2
(45) Date of Patent: Nov. 3, 2020

(54) SYSTEM AND METHOD FOR DRIVING NAKED-EYE 3D LIQUID CRYSTAL PRISM

(71) Applicant: Shenzhen China Star Optoelectronics Technology Co., Ltd., Shenzhen, Guangdong (CN)

(72) Inventors: Limin Wang, Guangdong (CN); Tai Jiun Hwang, Guangdong (CN)

(73) Assignee: SHENZHEN CHINA STAR OPTOELECTRONICS TECHNOLOGY CO., LTD., Shenzhen (CN)

( * ) Notice: Subject to any disclaimer, the term of this patent is extended or adjusted under 35 U.S.C. 154(b) by 183 days.

(21) Appl. No.: 15/562,834

(22) PCT Filed: Aug. 11, 2017

(86) PCT No.: PCT/CN2017/097037
§ 371 (c)(1),
(2) Date: Aug. 2, 2018

(87) PCT Pub. No.: WO2018/227741
PCT Pub. Date: Dec. 20, 2018

(65) Prior Publication Data
US 2020/0142214 A1     May 7, 2020

(30) Foreign Application Priority Data
Jun. 12, 2017 (CN) .......................... 2017 1 0436410

(51) Int. Cl.
G02F 1/29        (2006.01)
G02B 30/27      (2020.01)
(Continued)

(52) U.S. Cl.
CPC ........... *G02B 30/27* (2020.01); *G02F 1/1343* (2013.01); *G02F 1/13306* (2013.01); *G02F 1/29* (2013.01);
(Continued)

(58) Field of Classification Search
CPC ...................................................... G02F 1/29
See application file for complete search history.

(56) References Cited

U.S. PATENT DOCUMENTS 9,858,839 B2      1/2018  Wang et al.
2013/0107146 A1*  5/2013  Kim .................... G02F 1/1347
                                                          349/15

(Continued)

FOREIGN PATENT DOCUMENTS

CN    102566192 A    7/2012
CN    103293688 A    9/2013
(Continued)

OTHER PUBLICATIONS

Tang Xianzhu, Zhong Dezhen, Jian Tingxian, Lu Jiangang, Xie Hanping, Study on the design of low pressure driving liquid crystal lens, Journal of physics, vol. 62, No. 16, Dec. 31, 2013, pp. 164212-1-6.

(Continued)

*Primary Examiner* — Edmond C Lau

(57) ABSTRACT

Disclosed are a system and a method for driving a naked-eye 3D liquid crystal prism. The system includes a driving voltage determination module used to determine a corresponding driving voltage for each driving electrode in a display panel according to human eye space-position information; and a liquid crystal prism driving module used to generate a driving signal for driving a corresponding driving electrode according to the driving voltage, so as to adjust a shape of the liquid crystal prism.

11 Claims, 3 Drawing Sheets

(51) Int. Cl.
    *G02F 1/133*     (2006.01)
    *G02F 1/1343*     (2006.01)
    *G09G 3/00*     (2006.01)

(52) U.S. Cl.
    CPC ..... *G09G 3/003* (2013.01); *G09G 2320/0285* (2013.01)

(56) References Cited

U.S. PATENT DOCUMENTS

2013/0222234 A1    8/2013   Tanaka et al.
2019/0033681 A1*  1/2019   Lu .......................... G02B 30/27

FOREIGN PATENT DOCUMENTS

CN     104007585 A    8/2014
CN     104297994 A    1/2015

OTHER PUBLICATIONS

Fangyun, Zhangjian, Wuliying, Liujian, Control electrode of the auto focusing liquid crystal lens, Paper collection of 2004 National Optoelectronic Technology Academic Exchange Conference, Oct. 31, 2004, pp. 433-436.
Chinese Third Office Action for related Chinese Application No. 201710436410.4 action dated Mar. 12, 2020(25 Pages).

* cited by examiner

SYSTEM AND METHOD FOR DRIVING NAKED-EYE 3D LIQUID CRYSTAL PRISM

CROSS-REFERENCE TO RELATED APPLICATIONS

This application claims the priority of Chinese patent application CN 201710436410.4, entitled "System and method for driving naked-eye 3D liquid crystal prism" and filed on Jun. 12, 2017, the entirety of which is incorporated herein by reference.

FIELD OF THE INVENTION

The present disclosure relates to the technical field of display control, and in particular, to a system and a method for driving a naked-eye 3D liquid crystal prism.

BACKGROUND OF THE INVENTION

Naked-eye 3D display technologies have become a hotspot in researches of new display technologies because of its wide application prospect. Based on different technical principles for realization of naked-eye 3D effect, the naked-eye 3D technologies can be divided into three types, i.e., a light barrier technology, a columnar prism technology, and a directional backlight technology. The columnar prism technology further can be divided into a fixed prism technology and a liquid crystal prism technology based on a design of a prism. A naked-eye 3D liquid crystal prism technology is well received due to easiness of adjustment of display features and convenience of a switch between 2D and 3D modes.

A traditional naked-eye 3D liquid crystal prism has a fixed optimal viewing area and distance. Once a naked-eye 3D liquid crystal prism is designed, an optimal viewing area and distance would be fixed, and the liquid crystal prism is equivalent to a convex lens. A curvature of the equivalent liquid crystal prism determines deflection of left-eye and right-eye pictures, thereby determining an optimal viewing distance (an optimal viewing area is right opposite a middle portion of a display device, and left and right eyes are respectively in left and right viewing areas), as shown in FIG. 1.

SUMMARY OF THE INVENTION

In order to solve the above technical problem, the present disclosure provides a system and a method for driving a naked-eye 3D liquid crystal prism, so as to adjust a shape of a liquid crystal prism in a display device. Thus, an optimal viewing distance can be adjusted and a viewing experience of a 3D display device can be improved.

In one aspect, the present disclosure provides a system for driving a naked-eye 3D liquid crystal prism. The system comprises a driving voltage determination module and a liquid crystal prism driving module. The driving voltage determination module is used to determine a corresponding driving voltage for each driving electrode in a display panel according to human eye space-position information. The liquid crystal prism driving module is used to generate a driving signal for driving a corresponding driving electrode in according to the driving voltage, so as to adjust a shape of the liquid crystal prism.

According to an embodiment of the present disclosure, the driving voltage determination module further comprises a distance calculation unit and a driving electrode voltage selection unit. The distance calculation unit is used to calculate a vertical distance between a human eye and the display panel according to the human eye space-position information. The driving electrode voltage selection unit is used to select a corresponding driving voltage for each driving electrode according to the vertical distance.

According to an embodiment of the present disclosure, the driving voltage determination module further comprises a display look-up table used to store corresponding relation data between the vertical distance and the corresponding driving voltage of each driving electrode.

According to an embodiment of the present disclosure, the corresponding relation data enables a shape of the liquid crystal prism to keep symmetric along a center axis of the display panel in a vertical direction.

According to an embodiment of the present disclosure, the driving voltage determination module further comprises a human eye detection result receiving unit used to receive the human eye space-position information.

According to an embodiment of the present disclosure, the driving voltage determination module further comprises a signal output unit used to output each driving voltage to the liquid crystal prism driving module.

According to an embodiment of the present disclosure, the system further comprises a human eye recognition module used to capture the human eye space-position information.

In the other aspect, the present disclosure further provides a method for driving a naked-eye 3D liquid crystal prism. The method comprises following steps.

A corresponding driving voltage for each driving electrode in a display panel is determined according to human eye space-position information.

A driving signal is generated for driving a corresponding driving electrode according to the driving voltage, so as to adjust a shape of the liquid crystal prism.

According to an embodiment of the present disclosure, the step in which a corresponding driving voltage for each driving electrode in a display panel is determined according to human eye space-position information further comprises following steps.

A vertical distance between a human eye and the display panel is calculated according to the human eye space-position information.

A corresponding driving voltage for each driving electrode is selected according to the vertical distance.

According to an embodiment of the present disclosure, the step in which a corresponding driving voltage for each driving electrode is selected according to the vertical distance further comprises a step as follows.

A corresponding driving voltage for each driving electrode is selected according to corresponding relation data between the vertical distance and the corresponding driving voltage of each driving electrode. The corresponding relation data enables a shape of the liquid crystal prism to keep symmetric along a center axis of the display panel in a vertical direction.

The present disclosure has beneficial technical effects as follows.

In the present disclosure, an adjustment of an optimal viewing distance is realized by changing a shape of a liquid crystal prism, so that any viewing distance can be an optimal distance. Thus, a viewing experience of a naked-eye 3D display device can be improved.

Other advantages, objectives, and features of the present disclosure will be further explained in the following description, and partially become self-evident therefrom, or be understood through the embodiments of the present disclosure. The objectives and advantages of the present disclosure will be achieved through the structure specifically pointed out in the description, claims, and the accompanying drawings.

BRIEF DESCRIPTION OF THE DRAWINGS

The accompanying drawings provide further understandings of the present disclosure and constitute one part of the description. The drawings are used for interpreting the present disclosure together with the embodiments, not for limiting the present disclosure. In the drawings.

DETAILED DESCRIPTION OF THE EMBODIMENTS

The present disclosure will be explained in details hereafter with reference to the embodiments and the accompanying drawings, whereby it can be fully understood how to solve the technical problem by the technical means according to the present disclosure and achieve the technical effects thereof, and thus the technical solution according to the present disclosure can be implemented. It should be noted that, as long as there is no structural conflict, all the technical features mentioned in all the embodiments may be combined together in any manner, and the technical solutions obtained in this manner all fall within the scope of the present disclosure.

The present disclosure provides a system and a method for driving a naked-eye 3D liquid crystal prism. An adjustment of an optimal viewing distance is realized by adjusting a shape of a liquid crystal prism rather than human left-eye and right-eye image display data. Thus, a viewing experience of a naked-eye 3D display device can be improved.

Figure 1:
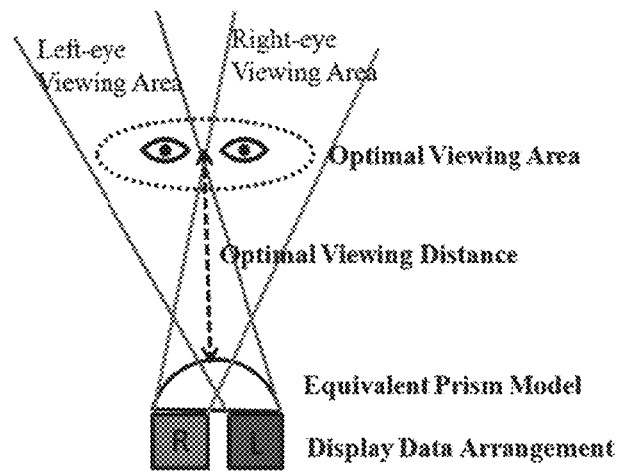
FIG. 1 schematically shows an optimal viewing area and distance of a naked-eye 3D liquid crystal prism in the prior art.
Figure 2:
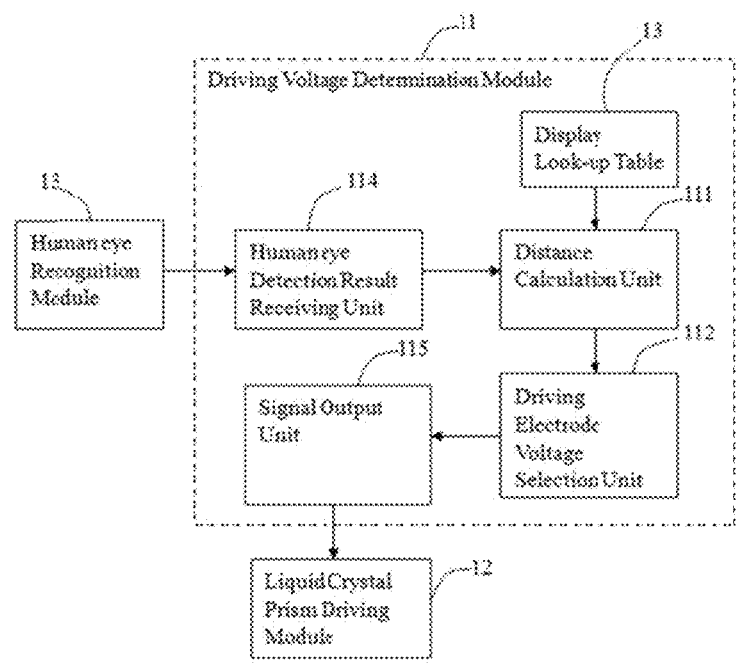
FIG. 2 schematically shows a structure of a system for driving a naked-eye 3D liquid crystal prism according to an embodiment of the present disclosure.

FIG. 2 schematically shows a structure of a system for driving a naked-eye 3D liquid crystal prism according to an embodiment of the present disclosure. The present disclosure will be illustrated hereafter in detail with reference to FIG. 2.

As shown in FIG. 2, the system for driving a naked-eye 3D liquid crystal prism comprises a driving voltage determination module 11 and a liquid crystal prism driving module 12. The driving voltage determination module 11 is used to determine a corresponding driving voltage of each driving electrode in a display panel according to human eye space-position information. The liquid crystal prism driving module 12 is used to generate a driving signal for driving a corresponding driving electrode according to a driving voltage, so as to adjust a shape of a liquid crystal prism. In the present disclosure, a voltage for driving a driving electrode of a liquid crystal prism is adjusted based on human eye space-position information, so that a shape of a liquid crystal prism is adjusted. Thus, the shape of the liquid crystal prism changes depending on the human eye space-position information. A viewing experience of a naked-eye 3D display device hence can be improved.

As shown in FIG. 2, in an embodiment of the present disclosure, the driving voltage determination module 11 further comprises a distance calculation unit 111 and a driving electrode voltage selection unit 112. The distance calculation unit 111 is used to calculate a vertical distance between a human eye and a display panel according to the human eye space-position information. The driving electrode voltage selection unit 112 is used to select a corresponding driving voltage of each driving electrode according to the vertical distance.

Figure 3:
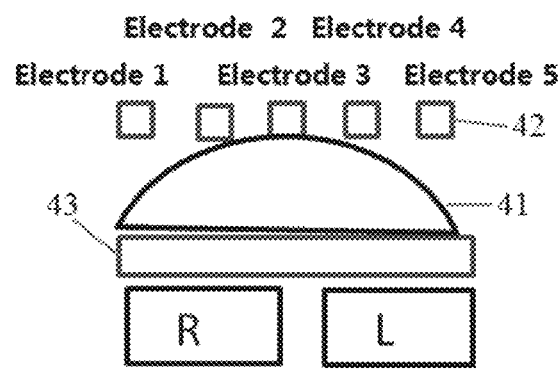
FIG. 3 schematically shows a structure of a naked-eye D liquid crystal prism and driving electrodes thereof in the prior art.

In an embodiment of the present disclosure, the driving voltage determination module 11 further comprises a display look-up table 113 used to store corresponding relation data between the vertical distance and the corresponding driving voltage of each driving electrode. That is, the look-up table 113 is configured to store data of different vertical distances between a human eye and a display panel as well as driving voltages of each electrode under conditions of the different vertical distances. Specifically, FIG. 3 schematically shows a structure of a naked-eye 3D liquid crystal prism and electrodes at both sides thereof in a display device in the prior art. A plurality of anode driving electrodes 42, such as an electrode 1, an electrode 2, an electrode 3, an electrode 4 and an electrode 5 are provided on an anode side of a liquid crystal prism 41. A cathode driving electrode 43 is provided on a cathode side of the liquid crystal prism 41. R denotes right-eye image data, and L denotes left-eye image data. By applying different driving voltages to the plurality of anode driving electrodes 42 and the cathode driving electrode 43, the liquid crystal prism 41 can be enabled to have different shapes and thus different curvatures. In this manner, an optimal viewing effect can be achieved at different viewing distances.

Preferably, the corresponding relation data enables a shape of the liquid crystal prism to keep symmetric along a center axis of the display panel in a vertical direction, specifically as shown in Table 1.

Different driving voltages are applied to the five anode driving electrodes in FIG. 3, and values of the applied driving voltages are kept symmetrical along a center portion (electrode 3) of the display panel in the vertical direction. Because the cathode driving electrode 43 is a planar electrode, an entirety thereof has one potential. Therefore, it is not necessary to apply different driving voltages to the cathode driving electrode 43. Of course, when the cathode driving electrode 43 has a structure with a plurality of driving electrodes like the anode driving electrode 42, different driving voltages can be applied to each driving electrode of the cathode driving electrode 43, and the present disclosure is not limited thereto.

TABLE 1

| Distance ↓ | Electrode 1 ↓ | Electrode 2 ↓ | Electrode 3 ↓ | Electrode 4 ↓ | Electrode 5 ↓ |
|---|---|---|---|---|---|
| 1.0 | 1 | 4 | 8 | 4 | 1 |
| 1.5 | 1 | 3.5 | 7 | 3.5 | 1 |

TABLE 1-continued

| Distance ↓ | Electrode 1 ↓ | Electrode 2 ↓ | Electrode 3 ↓ | Electrode 4 ↓ | Electrode 5 ↓ |
|---|---|---|---|---|---|
| 2.0 | 1 | 3 | 6 | 3 | 1 |
| 2.5 | 1 | 2.5 | 5 | 2.5 | 1 |
| 3.0 | 1 | 2 | 4 | 2 | 1 |
| 3.5 | 1 | 1.5 | 3 | 1.5 | 1 |

Figure 4:
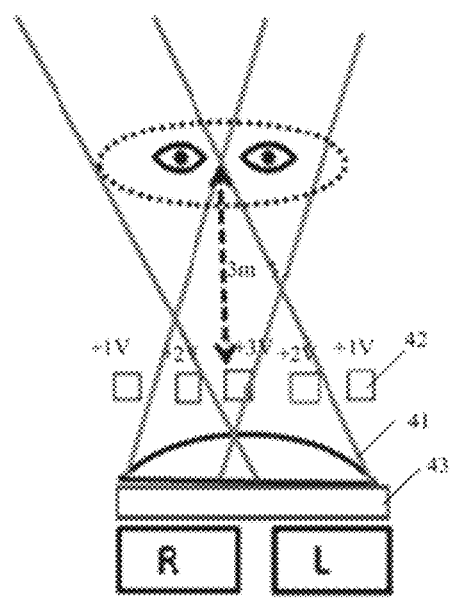
FIG. 4 schematically shows setting of driving voltages and arrangement of driving electrodes of a naked-eye 3D liquid crystal prism according to an embodiment of the present disclosure.
Figure 5:
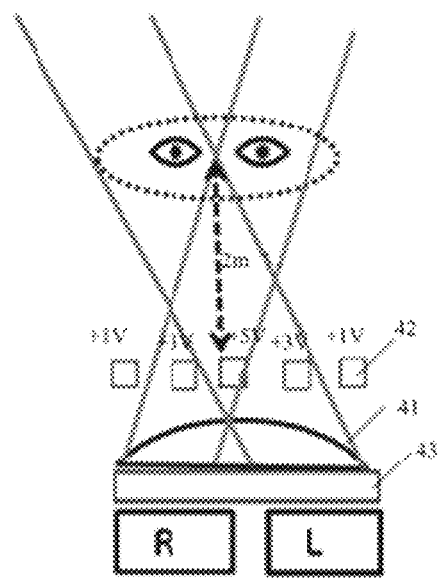
FIG. 5 schematically shows setting of driving voltages and arrangement of driving electrodes of a naked-eye 3D liquid crystal prism according to another embodiment of the present disclosure.

During operation of the driving system, when it is detected by a human eye recognition module that a distance between a human eye and a display panel monitored is 3 m, voltages in row 5 of the display look-up table (Table 1) are selected as driving voltages of corresponding driving electrodes, as shown in FIG. 4; when it is detected by the human eye recognition module that the distance between the human eye and the display panel is 2 m, voltages in row 3 of the display look-up table (Table 1) are selected as driving voltages of corresponding driving electrodes, as shown in FIG. 5. In this way, a shape of the liquid crystal prism can be adjusted based on a position of the human eye, and thus naked-eye 3D viewing effect can be improved.

In an embodiment of the present disclosure, the system further comprises a human eye recognition module 13 used to obtain human eye space-position information. Specifically, the human eye space-position information comprises coordinates of a middle point and an interpupillary distance between two eyes of a person who is watching a display screen. A face image of the person facing a screen viewing area can be captured by means of the human eye recognition module provided on a display device, so that coordinates of pupils of the two eyes in the face image can be recognized. Thus, a coordinate of a middle point between the two eyes and an interpupillary distance therebetween can be obtained. The coordinate of the middle point between the two eyes is a coordinate of a middle point of a connecting line between the pupils of the two eyes, and the interpupillary distance between the pupils of the two eyes is a distance between the pupils of the two eyes. Preferably, the coordinate of the middle point between the two eyes and the interpupillary distance therebetween in the face image are periodically obtained at predetermined time intervals.

After the coordinate of the middle point between the two eyes and the interpupillary distance therebetween in the face image are obtained, a vertical distance from the middle point between the two eyes to the display device can be calculated by the distance calculation unit 111 based on a preset algorithm. For example, an existing calibration algorithm can be used (eg., calibration algorithm by ZHANG Zhengyou) to obtain a relation curve showing the vertical distance from the middle point between the two eyes to the display device. Based on such relation curve, the vertical distance from the middle point between the two eyes to the display device is calculated. Of course, other algorithms can also be used in calculating the vertical distance between the middle point and the display device, and the present disclosure is not limited thereto.

A corresponding driving voltage of each driving electrode can be selected by the driving electrode voltage selection unit 112 based on the calculated vertical distance obtained by the distance calculation unit 111. That is, corresponding to different vertical distances, the driving electrode voltage selection unit 112 selects different driving voltages, and the different driving voltages cause the liquid crystal prism to have different shapes, Liquid crystal prisms of different shapes have different curvatures, and different curvatures correspond to different optimal viewing distances. Therefore, an optical viewing effect can be achieved at any distance by adjusting a shape of a liquid crystal prism.

According to an embodiment of the present disclosure, the driving voltage determination module 11 further comprises a human eye detection result receiving unit 114 used to receive human eye space-position information.

According to an embodiment of the present disclosure, the driving voltage determination module 11 further comprises a signal output unit 115 used to output a driving voltage signal to the liquid crystal prism driving module 12. The liquid crystal prism driving module 12 is configured to generate a corresponding driving signal based on the driving voltage signal, and deliver the driving signal to a corresponding electrode.

Figure 6:
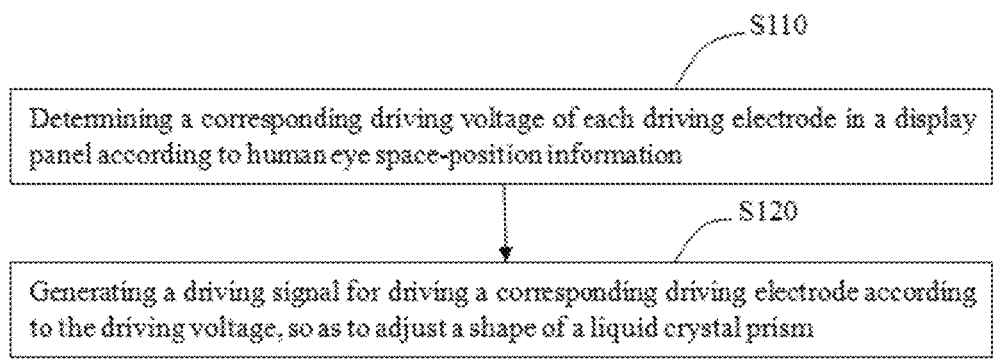
FIG. 6 shows a procedure of a method for driving a naked-eye 3D liquid crystal prism according to an embodiment of the present disclosure.

According to another aspect, the present disclosure further provides a method for driving a naked-eye 3D liquid crystal prism. As shown in FIG. 6, the method comprises following steps.

In step S110, a corresponding driving voltage of each driving electrode in a display panel is determined according to human eye space-position information. Specifically, a vertical distance between a human eye and a display panel is calculated by a driving voltage determination module 11 according to the human eye space-position information. After that, a corresponding driving voltage for each driving electrode is selected according to the vertical distance. The step in which a corresponding driving voltage for each driving electrode is selected according to the vertical distance further comprises: selecting a corresponding driving voltage for each driving electrode according to corresponding relation data between the vertical distance and a driving voltage of each driving electrode. The corresponding relation data enables a shape of the liquid crystal prism to be symmetric along a center axis of the display panel in a vertical direction.

In step S120, a driving signal is generated for driving each corresponding driving electrode according to the driving voltage, so as to adjust the shape of the liquid crystal prism. Specifically, the liquid crystal prism driving module 12 is configured to generate a driving signal for driving each corresponding driving electrode according to the driving voltage, so as to adjust the shape of the liquid crystal prism.

The above embodiments are described only for better understanding, rather than restricting, the present disclosure. Any person skilled in the art can make amendments to the implementing forms or details without departing from the spirit and scope of the present disclosure. The protection scope of the present disclosure shall be determined by the scope as defined in the claims.

The invention claimed is:

1. A system for driving a naked-eye 3D liquid crystal prism, wherein the system comprises:
   a driving voltage determination module used to determine a corresponding driving voltage for each driving electrode in a display panel according to human eye space-position information, wherein the driving voltage determination module comprises:
      a distance calculation unit used to calculate a vertical distance between a human eye and the display panel according to the human eye space-position information; and
      a driving electrode voltage selection unit used to select a corresponding driving voltage for each driving electrode according to the vertical distance;
      a display look-up table used to store corresponding relation data between the vertical distance and the corresponding driving voltage of each driving electrode; wherein the corresponding relation data between the vertical distance and the corresponding driving voltage of each driving electrode satisfies following relationships: when a vertical distance is 1.0 m, a first driving electrode is 1V, a second driving electrode is 4V, a third driving electrode is 8V, a fourth driving electrode is 4V, and a fifth driving electrode is 1V; when a vertical distance is 1.5 m, a first driving electrode is 1V, a second driving electrode is 3.5V, a third driving electrode is 7V, a fourth driving electrode is 3.5V, and a fifth driving electrode is 1 V; when a vertical distance is 2.0 m, a first driving electrode is 1V, a second driving electrode is 3V, a third driving electrode is 6V, a fourth driving electrode is 3V, and a fifth driving electrode is 1 V; when a vertical distance is 2.5 m, a first driving electrode is 1V, a second driving electrode is 2.5V, a third driving electrode is 5V, a fourth driving electrode is 2.5V, and a fifth driving electrode is 1 V; when a vertical distance is 3.0 m, a first driving electrode is 1V, a second driving electrode is 2V, a third driving electrode is 4V, a fourth driving electrode is 2V, and a fifth driving electrode is 1 V; when a vertical distance is 3.5 m, a first driving electrode is 1V, a second driving electrode is 1.5V, a third driving electrode is 3V, a fourth driving electrode is 1.5V, and a fifth driving electrode is 1 V; and a liquid crystal prism driving module used to generate a driving signal for driving a corresponding driving electrode according to the driving voltage, so as to adjust a shape of the liquid crystal prism.

2. The system according to claim 1, wherein the corresponding relation data enables a shape of the liquid crystal prism to keep symmetrical along a center axis of the display panel in a vertical direction.

3. The system according to claim 1, wherein the driving voltage determination module further comprises a human eye detection result receiving unit used to receive the human eye space-position information.

4. The system according to claim 1, wherein the driving voltage determination module further comprises a human eye detection result receiving unit used to receive the human eye space-position information.

5. The system according to claim 2, wherein the driving voltage determination module further comprises a human eye detection result receiving unit used to receive the human eye space-position information.

6. The system according to claim 3, wherein the driving voltage determination module further comprises a signal output unit used to output each driving voltage to the liquid crystal prism driving module.

7. The system according to claim 3, wherein the driving voltage determination module further comprises a signal output unit used to output each driving voltage to the liquid crystal prism driving module.

8. The system according to claim 4, wherein the driving voltage determination module further comprises a signal output unit used to output each driving voltage to the liquid crystal prism driving module.

9. The system according to claim 5, wherein the driving voltage determination module further comprises a signal output unit used to output each driving voltage to the liquid crystal prism driving module.

10. The system according to claim 1, further comprising a human eye recognition module used to obtain the human eye space-position information.

11. A method for driving a naked-eye 3D liquid crystal prism, wherein the method comprises:
  calculating a vertical distance between a human eye and the display panel according to the human eye space-position information; and
  selecting a corresponding driving voltage for each driving electrode according to corresponding relation data of the vertical distance and a corresponding driving voltage of each driving electrode, wherein the corresponding relation data enables a shape of the liquid crystal prism to be symmetric along a center axis of the display panel in a vertical direction, and the corresponding relation data between the vertical distance and the corresponding driving voltage of each driving electrode satisfies following relationships: when a vertical distance is 1.0 m, a first driving electrode is 1V, a second driving electrode is 4V, a third driving electrode is 8V, a fourth driving electrode is 4V, and a fifth driving electrode is 1V; when a vertical distance is 1.5 m, a first driving electrode is 1V, a second driving electrode is 3.5V, a third driving electrode is 7V, a fourth driving electrode is 3.5V, and a fifth driving electrode is 1 V; when a vertical distance is 2.0 m, a first driving electrode is 1V, a second driving electrode is 3V, a third driving electrode is 6V, a fourth driving electrode is 3V, and a fifth driving electrode is 1 V; when a vertical distance is 2.5 m, a first driving electrode is 1V, a second driving electrode is 2.5V, a third driving electrode is 5V, a fourth driving electrode is 2.5V, and a fifth driving electrode is 1 V; when a vertical distance is 3.0 m, a first driving electrode is 1V, a second driving electrode is 2V, a third driving electrode is 4V, a fourth driving electrode is 2V, and a fifth driving electrode is 1 V; when a vertical distance is 3.5 m, a first driving electrode is 1V, a second driving electrode is 1.5V, a third driving electrode is 3V, a fourth driving electrode is 1.5V, and a fifth driving electrode is 1 V; and
  generating a driving signal for driving a corresponding electrode according to the driving voltage, so as to adjust a shape of the liquid crystal prism.

* * * * *